United States Patent [19]

Satoh

[11] Patent Number: 4,631,468

[45] Date of Patent: Dec. 23, 1986

[54] BATTERY CHARGING CIRCUIT FOR ELECTRONIC APPARATUS

[75] Inventor: Masaharu Satoh, Nara, Japan

[73] Assignee: Sharp Kabushiki Kaisha, Osaka, Japan

[21] Appl. No.: 604,009

[22] Filed: Apr. 26, 1984

[30] Foreign Application Priority Data

Apr. 30, 1983 [JP] Japan .................................. 58-77815

[51] Int. Cl.$^4$ .............................................. H02J 7/04
[52] U.S. Cl. ........................................ 320/14; 307/66; 320/22; 320/39
[58] Field of Search .............................. 320/2, 22–24, 320/13, 14, 39, 40, 35, 36; 307/66

[56] References Cited

U.S. PATENT DOCUMENTS

| | | | |
|---|---|---|---|
| 3,214,670 | 10/1965 | Schaf | 320/22 X |
| 3,344,899 | 10/1967 | Wang et al. | 320/2 X |
| 3,521,142 | 7/1970 | Ludlam | 320/23 X |
| 4,152,635 | 5/1979 | Scott, Jr. | 320/39 X |
| 4,233,553 | 11/1980 | Prince et al. | 320/39 X |

Primary Examiner—R. J. Hickey
Attorney, Agent, or Firm—Birch, Stewart, Kolasch & Birch

[57] ABSTRACT

A battery charging circuit comprises a first circuit provided for interrupting the power supplied to a load to rapid charge a secondary battery with an external power source, and a second circuit provided for enabling the power supplied to the load and charging the secondary battery with a trickle charge. A control circuit is provided for selectively activating the first circuit and the second circuit.

5 Claims, 5 Drawing Figures

BATTERY CHARGING CIRCUIT FOR ELECTRONIC APPARATUS

BACKGROUND OF THE INVENTION

The present invention relates to an electronic circuit and, more particularly, to a battery charging circuit for an electronic apparatus.

Some electronic apparatus are of the type in which a secondary battery and an AC adapter that is connectable to a commercial power source are both provided. When the electronic apparatus is hand carried, the secondary battery is used as a power source. When a commercial power source is available, the AC adapter is used to power the device. After the secondary battery has been completely discharged, the AC adapter is used to charge the secondary battery. The secondary battery may be removed from the electronic apparatus tocharge it by means of an external specific charger.

A trickle charge mode is referred to as the mode in which the secondary battery is recharged while the electronic apparatus is in operation powered by the A.C. adapter that is coupled to the apparatus. This charging mode is a continuous charging of the secondary battery at a low rate for a long time. If in the trickle mode while the electronic apparatus is not in operation, the charging time will not be shortened.

In the conventional trickle charge mode, an overcurrent may flow for discharging, depending on the discharging condition of the secondary battery, so that no current can flow into a load. Further, an overload may be caused on the AC adapter that thereby damages the AC adapter. To prevent damage to the AC adapter, the adapter should have a greater current capacity. Increasing the current capacity results in a loss of the compactness of the electronic apparatus. Instead of increasing the current capacity of the AC adapter, an overcurrent preventing means may be incorporated. Such an overcurrent preventing means may develop problems in that it may be operated in a condition such that, when the discharging current of the secondary battery is great, the current to be applied to the load is less than the normal condition.

SUMMARY OF THE INVENTION

Accordingly, it is an object of the present invention to provide an improved battery charging circuit for selecting either a forced charge mode or a trickle charge mode to a secondary battery.

It is another object of the present invention to provide an improved charging circuit for charging a secondary battery regardless of the discharging condition of the secondary battery to be charged.

It is a further object of the present invention to provide an improved charging circuit for selectively supplying electric power to either a secondary battery or a load of an electronic apparatus.

Briefly described, in accordance with the present invention, a battery charging circuit for an electronic apparatus comprises a first circuit for interrupting the power supplied to a load to rapidly charge a secondary battery with an external power source when in a rapid charge mode, a second circuit provided for enabling the power to be supplied to the load and charge the secondary battery in a trickle charge mode, and a control circuit provided for selectively activating the first circuit or the second circuit.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
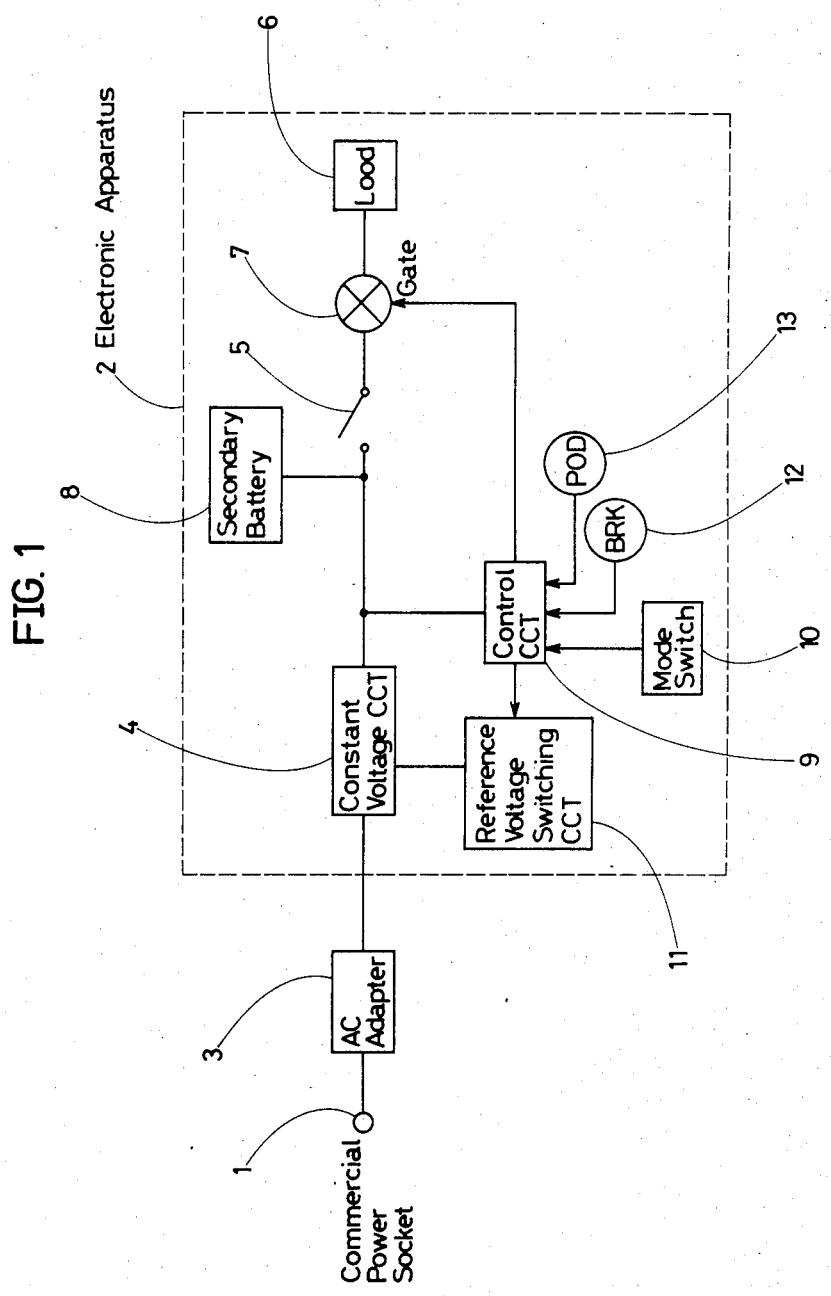
FIG. 1 is a block diagram of a battery charging circuit according to a preferred embodiment of the present invention.

FIG. 1 is a block diagram of a battery charging circuit according to a preferred embodiment of the present invention. Referring to FIG. 1, there is provided a commercial power socket 1, an electronic apparatus 2, and an AC adapter 3. The electronic apparatus 2 comprises a constant voltage circuit 4, a power switch 5, a load 6, a gate 7, a secondary battery 8, a control circuit 9, a mode switch 10, and a reference voltage switching circuit 11.

The commercial power socket 1 supplies commercial power to the constant voltage circuit 4 of the electronic apparatus 2 via the AC adapter 3. The constant voltage circuit 4 makes the commercial power voltage constant. According to control signals developed by the control circuit 9, the gate 7 is switched. When the power switch 5 and the gate 7 are switched to be conductive, the constant power is transferred from the constant voltage circuit 4 into the load 6. The secondary battery 8 is charged by the constant output of the constant voltage circuit 4. The mode switch 10 is operated by the operator to select either a rapid charge mode or a trickle charge mode for charging the secondary battery 8 as will be described below. The control circuit 9 is responsive to th conditions of the mode switch 10 for activating the gate 7 and the reference voltage switching circuit 11.

When the mode switch 10 is place in the rapid charge mode, the control circuit 9 controls the gate 7 and the reference voltage switching circuit 11, so that the gate 7 becomes unconductive and the reference voltage switching circuit 11 provides a low reference voltage into the constant voltage circuit 4. Therefore, regardless of the conditions of the power switch 5, any power to the load 6 is interrupted and the constant voltage circuit 4 provides a voltage higher than the normal condition (the trickle charge mode). Thus, all the power supplied by the constant voltage circuit 4 is entered into the secondary battery 8 to charge it, so that it is fully charged in a short time.

When the mode switch 10 is placed in the normal mode (the trickle charge mode) rather than the rapid charge mode, the control circuit 9 controls the gate 7 and the reference voltage switching circuit 11 such that the gate 7 becomes conductive and the reference voltage switching circuit 11 provides a normal reference voltage into the constant voltage circuit 4. Therefore, depending upon the conditions of the power switch 5, the constant power to the load 6 flows and is uninterrupted. The constant voltage circuit 4 provides the normal voltage. Thus, the current flowing out of the constant voltage circuit 4 charges the secondary battery 8 in the trickle charge mode of a continuous charge mode at a low rate for a long time.

A break signal designated by 12 is developed in the electronic apparatus 2 to permit the control circuit 9 to turn the gate 7 OFF, so that the power is turned off regardless of the conditions of the power switch 5. A signal designated by 13 is developed by an overdischarging detection circuit of the secondary batter 8. Responsive to the generation of the signal 13, the control circuit 9 turns the gate OFF.

Figure 2:
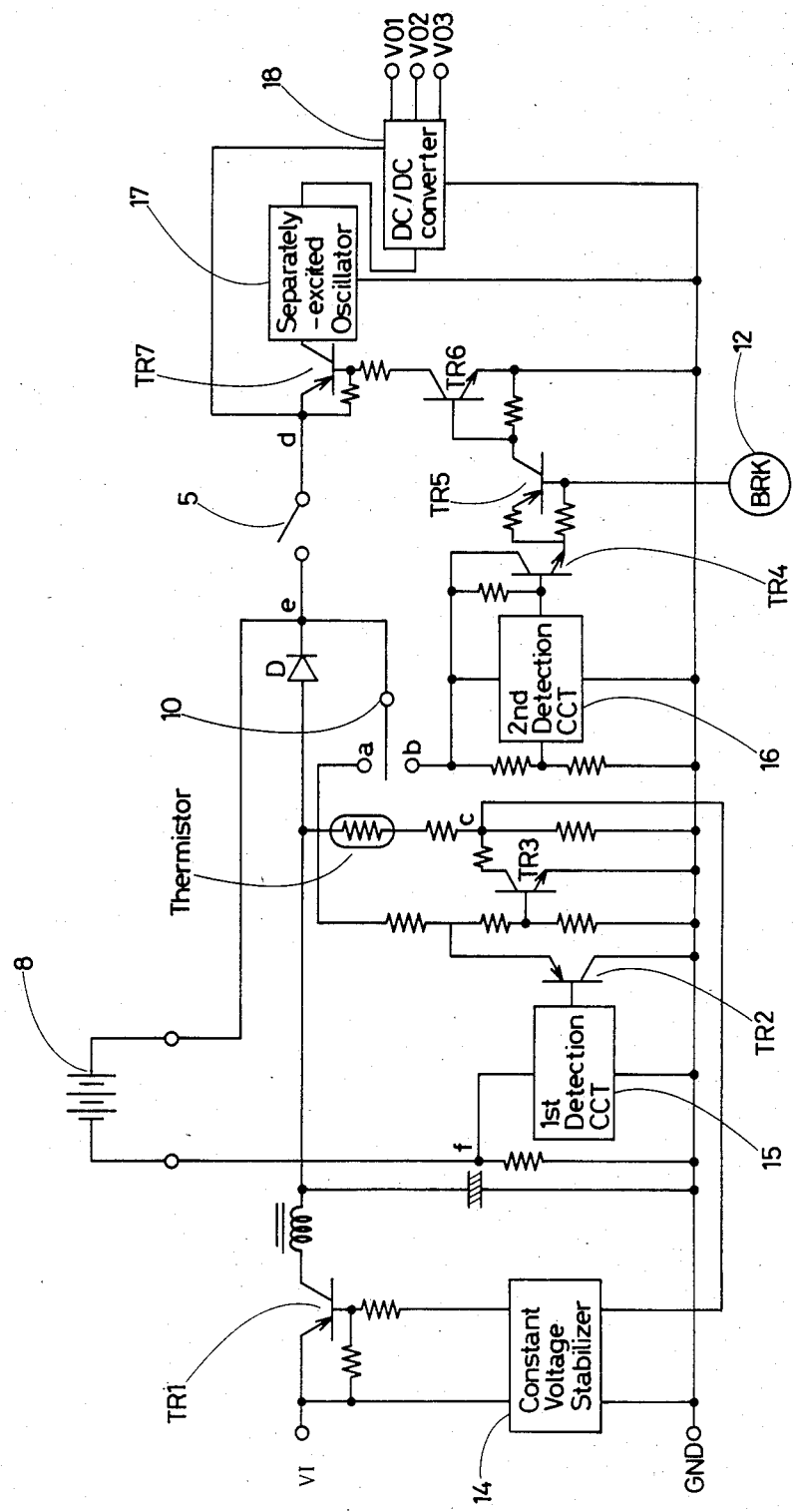
FIG. 2 is a mode detailed circuit configuration of the battery charging circuit of FIG. 1.

FIG. 2 is a more detailed configuration of the circuit of FIG. 1. Like elements as those of FIG. 1 are indicated by like numerals.

With reference to FIG. 2, a constant voltage stabilizer 14 is of a chopper type. A power voltage VI outputted from the AC adapter 3 is made constant by the switching of a transistor TR1 by the control of the constant voltage stabilizer 14. The power voltage VI is made constant with reference to a voltage appearing at a point c. A separately-excited oscillator 17 is coupled to a DC/DC converter 18 for exciting it. The DC/DC converter 18 outputs converted output VO1, VO2, and VO3. The separately-excited oscillator 17 is oscillated in response to the conductive condition of a transistor TR7 and stops the oscillation in response to the nonconductive condition of the transistor TR7. The transistor TR7 corresponds to the gate 7 in FIG. 1, except that the transistor TR7 is provided to control the oscillation of the oscillator 17 because the DC/DC converter 18 is powered by a voltage appearing at a point d.

The mode switch 10 is connected to a terminal a to select the rapid charge mode. When the mode switch 10 is connected to the terminal a, the base voltage of the transistor TR3 is increased, so that the transistor TR3 turn ON. Therefore, the voltage bearing at the point c is reduced, so that the constant voltage stabilizer 14 starts to switch the transistor TR1 such that a higher voltage appears at a point e.

A second detection circuit 16 is provided for detecting the voltage of the secondary battery 8 and the voltage at the point e to detect whether the secondary battery 8 is overdischarged or whether the mode switch 10 is connected to the terminal a. While the mode switch 10 is connected to the terminal a, the second detection circuit 16 reduces the base voltage of the transistor TR4. The transistor TR4 is thereby turned OFF, so that each of transistors TR5, TR6, and TR7 turns OFF. Therefore, the power supply to the electronic apparatus 2 is interrupted regardless of the conditions of the power switch 5.

While the mode switch 10 is connected to a terminal b, the base voltage of a transistor TR3 is reduced, so that the transistor TR3 is turned OFF. Then, the voltage at the point c is increased to be the normal reference voltage. The constant voltage stabilizer 14 thereby switches the transistor TR1 such that the normal voltage appears at the point e. When the second detection circuit 16 detects that the normal voltage appears at the point e, the circuit 16 switches the transistor TR4 ON. Since the break signal 12 is of the ground level, the transistors TR5, TR6, and TR7 are all turned ON. When the power switch 5 is conductive, the power can be applied to the electronic apparatus 2. Even when the mode switch 10 is connected to the terminal b, the second detection circuit 16 detects that the voltage of the secondary battery 8 is lower than the normal voltage, to thereby turn the transistor TR7 OFF. At this stage, the second detection circuit 16 provides an output signal corresponding to the signal 13 of FIG. 1.

A first detection circuit 15 is provided for detecting whether the charging current is below the normal value. The circuit 15 turns a transistor TR2 ON by detecting that a voltage appearing at a point f is below the normal value. Even when the mode switch 10 is connected to the terminal a to select the forced charge mode and the transistor TR3 is turned ON, the transistor TR2 is then turned ON to thereby turn the transistor TR3 OFF, so that the voltage appearing at the point c becomes a voltage at the normal mode (the trickle charge mode). Thus, even when the rapid charge mode is left selected, the rapid charge mode is released once the secondary battery 8 has been fully charged.

TH designates a thermister provided for controlling the reference voltage appearing at the point c.

Figure 3:
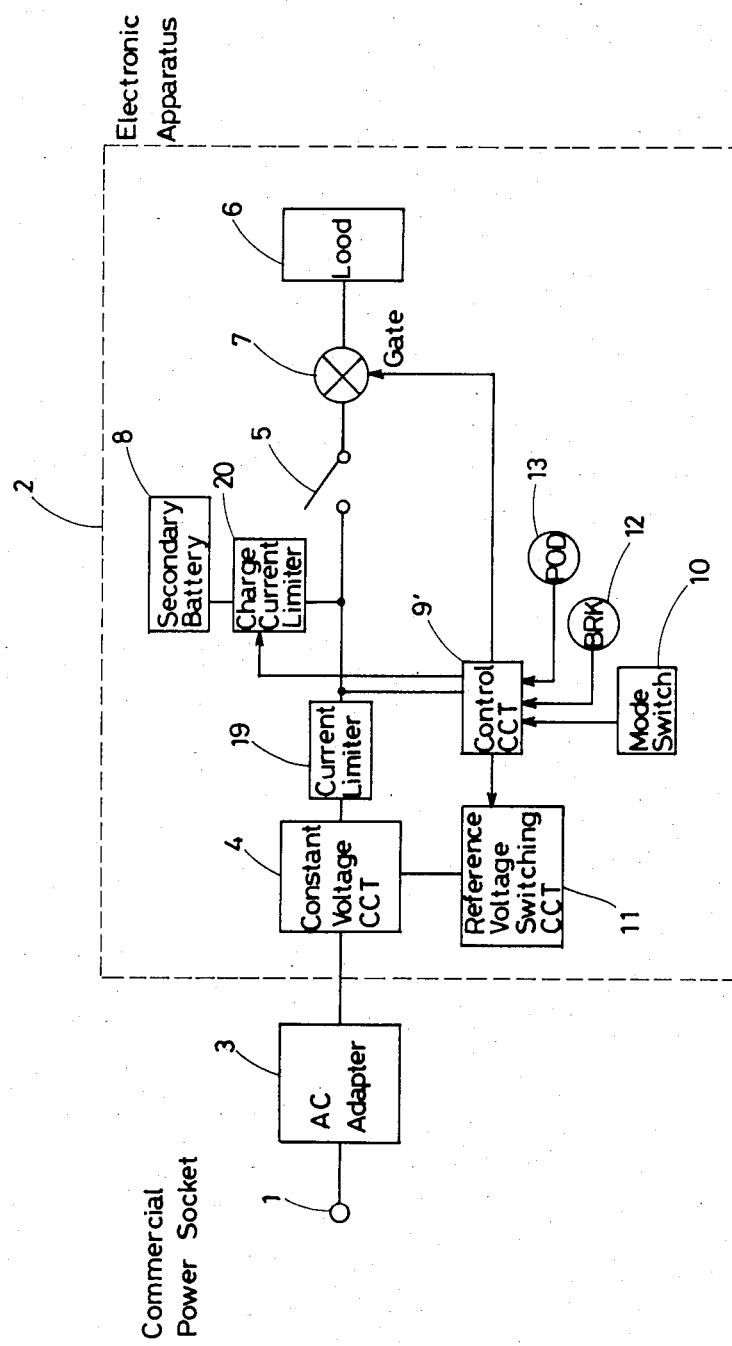
FIG. 3 is a block diagram of a battery charging circuit according to another preferred embodiment of the present invention.

FIG. 3 is a block diagram of a battery charging circuit according to another preferred embodiment of the present invention featured in that the two battery charge modes can be effectively controlled.

Like elements of FIG. 3 are indicated by like numerals. The circuit of FIG. 3 is similar to that of FIG. 1, except that a current limiter 19 is interposed at the stage following the constant voltage circuit 4, that a charge current limiter 20 is interposed and connected to the secondary battery 8, and that a second control circuit 9' is provided for controlling the operation of the charge current limiter 20.

Referring to FIG. 3, while the mode switch 10 is placed to select the normal mode (the trickle charge mode), the constant voltage circuit 4 provides the normal constant voltage to enable the trickle charge of the secondary battery 8. During this period, the charge current limiter 20 is placed in an operative condition in response to the output signal of the second control circuit 9'. Therefore, if the charging current exceeds the predetermined value, the charge current limiter 20 is operated to limit the charging current.

Figure 4:
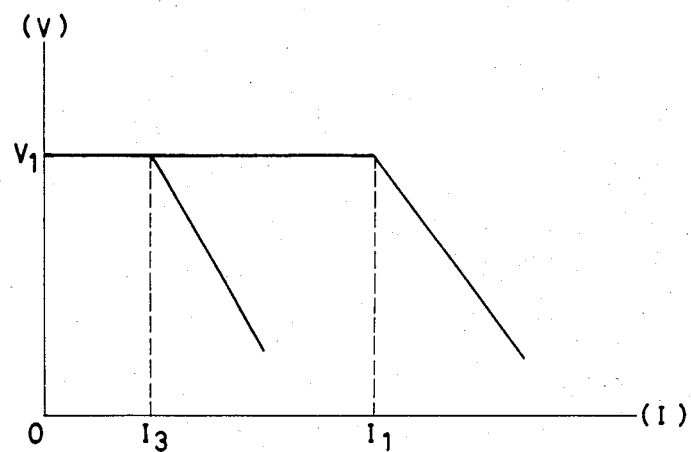
FIG. 4(A) and 4(B) are graphs showing the operation of the circuit of FIG. 3.
Figure 4:
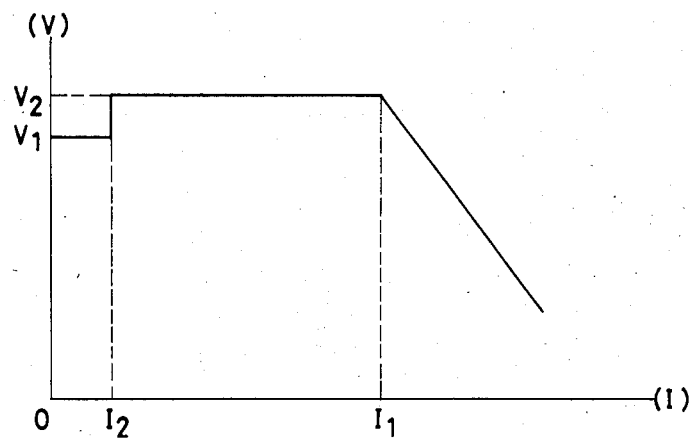

FIGS. 4(A) and 4(B) are graphs showing the characteristics of the charging current from the constant voltage circuit 4 in the normal mode (the trickle charge mode) and the rapid charge mode, respectively.

Referring to FIG. 4(A), the charge current limiter 20 starts to operate above a current I3 of the charging current. On the other hand, the current limiter 19 starts to operate above a current I1 of the charging current. It is assumed that, when the secondary battery 8 has been almost discharged, the electronic apparatus 2 is operated in the normal mode (the trickle charge mode). In such a case, the charging current of the secondary battery 8 becomes above the current I3, so that the limiter 20 starts to operate. If the limiter 20 is not provided, the sum of the charging current from the constant voltage circuit 4 and the current flowing into the load 6 exceeds the value of the current I1, so that the limiter 19 starts to operate to thereby prevent the secondary battery 8 from being charged and the electronic apparatus 2 from being operated. Without the provision of the limiter 19, any overcurrent more than the rated current may flow into the AC adapter 3.

While the mode switch 10 is placed in the rapid charge mode, the second control circuit 9' controls the reference voltage switch circuit 11 such that the constant voltage circuit 4 outputs the rapid charge voltage. The control circuit 9' turns the gate nonconductive to make the limiter 20 inoperative. Therefore, the charging current can exceed the current I3.

With reference to FIG. 4(B), the charging current can flow before the limiter 19 starts to operate, namely, the current is slightly above the current I1. When the charging current is below the value of a current I2, the signal 13 is generated so that the output voltage of the constant voltage circuit 4 is a trickle charge voltage V1.

While only certain embodiments of the present invention have been described, it will be apparent to those skilled in the art that various changes and modifications may be made therein without departing from the spirit and scope of the present invention as claimed.

What is claimed is:

1. A charging circuit for charging a battery from an external power supply and supplying power to a load comprising:
   first charging means provided for interrupting the supply of power from said external power supply to the load to rapidly charge a secondary battery from said external power supply in a rapid charge mode;
   second charging means provided for enabling the supply of power to said load from said external power supply to charge said secondary battery in a trickle charge mode; and
   control means for selectively activating said first charging means or said second charging means, said control means including,
   a constant voltage circuit for developing a constant voltage,
   a reference voltage circuit for generating two kinds of reference signals,
   a mode switch for selectively switching between said first charging means and said second charging means,
   a gate coupled to said load, and
   a control circuit responsive to the switching of said mode switch for controlling said reference voltage circuit and said gate.

2. The device of claim 1, wherein said reference voltage circuit supplies a low reference voltage in said rapid charge mode and a high reference voltage in said trickle charge mode.

3. A device for supplying power from a primary power source to an external load comprising:
   a constant voltage circuit connected to said primary power source and producing a regulated power voltage output;
   a secondary battery voltage source connected across said regulated power voltage output;
   mode selection means for selecting between a trickle charge mode and a rapid charge mode;
   first detection and control means, enabled when said rapid charge mode is selected by said mode selection means, for detecting whether the charging current to be applied to said secondary battery voltage source is below a normal level and for reducing the voltage applied to said secondary battery voltage source in response thereto to disable rapid charging; and second detection and control means, operatively connected to said mode selection means, for disconnecting said external load from said device when said rapid charge mode is selected and for monitoring the voltage across said secondary battery voltage source, when in said trickle charge mode, to determine if said secondary battery voltage source is overly discharged and disconnecting said external load from said device when said secondary battery voltage source is overly discharged.

4. The device of claim 3 wherein said constant voltage circuit includes a reference voltage switching circuit responsive to said mode selection means,
   said regulated power voltage output being controlled by said reference voltage switching circuit to be a higher voltage in said rapid charge mode than in said trickle charge mode.

5. The device of claim 4 wherein said reference voltage switching circuit includes a thermistor connected across a pair of circuit points having a voltage developed thereacross which is related to said regulated power voltage output.

* * * * *